US012762407B2

(12) United States Patent
Desai et al.

(10) Patent No.: US 12,762,407 B2
(45) Date of Patent: Oct. 13, 2026

(54) MULTI-OBJECTIVE DRIVEN REFACTORING OF A MONOLITH APPLICATION USING REINFORCEMENT LEARNING

(71) Applicant: International Business Machines Corporation, Armonk, NY (US)

(72) Inventors: Utkarsh Milind Desai, Bangalore (IN); Srikanth Govindaraj Tamilselvam, Chennai (IN); Sai Koti Reddy Danda, Narasaraopeta (IN)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 17/543,312

(22) Filed: Dec. 6, 2021

(65) Prior Publication Data

US 2023/0177337 A1 Jun. 8, 2023

(51) Int. Cl.
*G06N 3/082* (2023.01)
*G06F 18/21* (2023.01)
(Continued)

(52) U.S. Cl.
CPC ......... *G06N 3/082* (2013.01); *G06F 18/2178* (2023.01); *G06F 18/23* (2023.01); *G06N 3/084* (2013.01); *G06N 3/086* (2013.01)

(58) Field of Classification Search
CPC ........ G06N 3/082; G06N 3/084; G06N 3/086; G06N 3/088; G06N 3/092; G06N 5/01; G06F 18/2178; G06F 18/23; G06F 8/77
See application file for complete search history.

(56) References Cited

U.S. PATENT DOCUMENTS 7,921,371 B1 * 4/2011 Roubtsov ................ G06F 30/15
715/764
10,430,250 B2 10/2019 Ishikawa et al.
(Continued)

FOREIGN PATENT DOCUMENTS

CN 109948710 6/2019
CN 112398899 2/2021
(Continued)

OTHER PUBLICATIONS

Newman et al., Modularity and community structure in networks (2006) (Year: 2006).*
(Continued)

*Primary Examiner* — Jennifer N Welch
(74) *Attorney, Agent, or Firm* — Ryan, Mason & Lewis, LLP

(57) ABSTRACT

Methods, systems, and computer program products for multi-objective driven refactoring of a monolith application using reinforcement learning are provided herein. A computer-implemented method includes obtaining multiple code modules of a monolith application and a plurality of conflicting metrics for determining a set of microservices for the monolith application; performing a reinforcement learning-based clustering process that iteratively generates a plurality of clusters comprising the code modules based at least in part on feedback provided for the plurality of conflicting metrics at each iteration; generating candidate microservices for the monolith application, wherein each candidate microservice corresponds to a different one of the plurality of clusters; and outputting the generated candidate microservices to at least one of a system and a user.

20 Claims, 7 Drawing Sheets

(51) Int. Cl.

| | |
|---|---|
| ***G06F 18/23*** | (2023.01) |
| ***G06N 3/084*** | (2023.01) |
| ***G06N 3/086*** | (2023.01) |

(56) References Cited

U.S. PATENT DOCUMENTS

| | | | |
|---|---|---|---|
| 10,637,952 B1 | 4/2020 | Koenig et al. | |
| 10,936,291 B1 | 3/2021 | Gamliel et al. | |
| 11,467,826 B1 | 10/2022 | Chawda et al. | |
| 11,726,778 B2 | 8/2023 | Sridhara et al. | |
| 11,762,639 B2 * | 9/2023 | Jaeger | G06F 8/36 717/143 |
| 11,768,679 B2 | 9/2023 | Tamilselvam et al. | |
| 11,847,443 B2 | 12/2023 | Tamilselvam et al. | |
| 2003/0005258 A1 | 1/2003 | Modha et al. | |
| 2017/0187785 A1 | 6/2017 | Johnson et al. | |
| 2017/0364434 A1 | 12/2017 | Kairali et al. | |
| 2018/0365008 A1 | 12/2018 | Chandramouli et al. | |
| 2019/0108067 A1 | 4/2019 | Ishikawa et al. | |
| 2019/0116047 A1 | 4/2019 | Struttmann et al. | |
| 2019/0138428 A1 | 5/2019 | Sumitomo et al. | |
| 2019/0250912 A1 | 8/2019 | Gavisiddappa Kodigenahalli et al. | |
| 2019/0279038 A1 | 9/2019 | Nicol | |
| 2019/0361686 A1 | 11/2019 | Gnazdowsky et al. | |
| 2020/0042315 A1 | 2/2020 | Gupta | |
| 2020/0042328 A1 | 2/2020 | Gupta | |
| 2020/0097390 A1 | 3/2020 | Gunter | |
| 2020/0160121 A1 | 5/2020 | Parasrampuria et al. | |
| 2020/0192690 A1 | 6/2020 | Gupta et al. | |
| 2020/0218634 A1 | 7/2020 | Jones et al. | |
| 2020/0401386 A1 | 12/2020 | Punathil et al. | |
| 2021/0011688 A1 | 1/2021 | Sasidharan et al. | |
| 2021/0124577 A1 | 4/2021 | Gupta | |
| 2021/0232390 A1 | 7/2021 | Hwang et al. | |
| 2022/0060431 A1 | 2/2022 | Vadayadiyil Raveendran et al. | |
| 2022/0188104 A1 | 6/2022 | Wan et al. | |
| 2022/0301173 A1 | 9/2022 | Cheng et al. | |

FOREIGN PATENT DOCUMENTS

| | | |
|---|---|---|
| CN | 113204465 | 8/2021 |
| JP | 2009-251769 A | 10/2009 |
| JP | 2016-224915 A | 12/2016 |
| JP | 2017-504910 A | 2/2017 |
| JP | 2018-010438 A | 1/2018 |
| JP | 2021-089722 A | 6/2021 |
| JP | 2023-038909 A | 3/2023 |
| WO | 2015/117013 A1 | 8/2015 |
| WO | 2019209231 A2 | 10/2018 |
| WO | 2021064058 A1 | 4/2021 |
| WO | 2021/148927 A1 | 7/2021 |
| WO | 2023/098302 A1 | 6/2023 |

OTHER PUBLICATIONS

Bittencourt et al, Comparison of Graph Clustering Algorithms for Recovering Software Architecture Module Views (2009) (Year: 2009).*

Zio et al., A clustering procedure for reducing the number of representative solutions in the Pareto Front of multiobjective optimization problems (2010) (Year: 2010).*

Couetoux, Monte Carlo Tree Search for Continuous and Stochastic Sequential Decision Making Problems (2014) (Year: 2014).*

Mazlami et al., Extraction of Microservices from Monolithic Software Architectures (2017) (Year: 2017).*

Guez et al., Learning to Search with MCTSnets (2018) (Year: 2018).*

Jin et al., Functionality-oriented Microservice Extraction Based on Execution Trace Clustering (2018) (Year: 2018).*

Chaudhary et al., Anomaly Detection Using Graph Neural Networks (2019) (Year: 2019).*

Jin et al., Service Candidate Identification from Monolithic Systems Based on Execution Traces (2019) (Year: 2019).*

Yang et al., MIRAS Model-based Reinforcement Learning for Microservice Resource Allocation over Scientific Workflows, (2019) (Year: 2019).*

Gokturk et al., Jindo Smart Microservice Monitoring and Development Tool, (Jul. 2021) (Year: 2021).*

Bittencourt, R.A. and Guerrero, D.D.S., 2009, March. Comparison of graph clustering algorithms for recovering software architecture module views. In 2009 13th European Conference on Software Maintenance and Reengineering (pp. 251-254). IEEE. (Year: 2009).*

Zio, E. and Bazzo, R., 2011. A clustering procedure for reducing the number of representative solutions in the Pareto Front of multiobjective optimization problems. European Journal of Operational Research, 210(3), pp. 624-634. (Year: 2011).*

Newman, M.E., 2006. Modularity and community structure in networks. Proceedings of the national academy of sciences, 103(23), pp. 8577-8582. (Year: 2006).*

Bittencourt, R.A. and Guerrero, D.D.S., Mar. 2009, Comparison of graph clustering algorithms for recovering software architecture module views. In 2009 13th European Conference on Software Maintenance and Reengineering (pp. 251-254). IEEE. (Year: 2009).*

Zio, E. and Bazzo, R., 2011. A clustering procedure for reducing the No. of representative solutions in the Pareto Front of multiobjective optimization problems. European Journal of Operational Research, 210(3), pp. 624-634. (Year: 2011).*

Couetoux, A., 2013. Monte Carlo tree search for continuous and stochastic sequential decision making problems (Doctoral dissertation, Université Paris Sud-Paris XI). (Year: 2013).*

Mazlami, G., Cito, J. and Leitner, P., 2017, June. Extraction of microservices from monolithic software architectures. In 2017 IEEE International Conference on Web Services (ICWS) (pp. 524-531). IEEE. (Year: 2017).*

Guez, A., Weber, T., Antonoglou, I., Simonyan, K., Vinyals, O., Wierstra, D., Munos, R. and Silver, D., Jul. 2018, Learning to search with mctsnets. In International conference on machine learning (pp. 1822-1831). PMLR. (Year: 2018).*

Jin, W., Liu, T., Zheng, Q., Cui, D. and Cai, Y., Jul. 2018, Functionality-oriented microservice extraction based on execution trace clustering. In 2018 IEEE International Conference on Web Services (ICWS) (pp. 211-218). IEEE. (Year: 2018).*

Yang, Z., Nguyen, P., Jin, H. and Nahrstedt, K., Jul. 2019, MIRAS: Model-based reinforcement learning for microservice resource allocation over scientific workflows. In 2019 IEEE 39th international conference on distributed computing systems (ICDCS) (pp. 122-132). IEEE. (Year: 2019).*

Chaudhary, A., Mittal, H. and Arora, A., Feb. 2019, Anomaly detection using graph neural networks. In 2019 international conference on machine learning, big data, cloud and parallel computing (COMITCon) (pp. 346-350). IEEE. (Year: 2019).*

Wikipedia, Breadth-first search (2019) (Year: 2019).*

Jin, W., Liu, T., Cai, Y., Kazman, R., Mo, R. and Zheng, Q., 2019. Service candidate identification from monolithic systems based on execution traces. IEEE Transactions on Software Engineering, 47(5), pp. 987-1007. (Year: 2019).*

Chen, D., Wang, Y. and Gao, W., 2020. Combining a gradient-based method and an evolution strategy for multi-objective reinforcement learning. Applied Intelligence, 50(10), pp. 3301-3317. (Year: 2020).*

Karavisileiou, A., Mainas, N., Bouraimis, F. and Petrakis, E.G., Apr. 2021, Automated ontology instantiation of OpenAPI REST service descriptions. In Future of Information and Communication Conference (pp. 945-962). Cham: Springer International Publishing. (Year: 2021).*

Mancoridis, S., Mitchell, B.S., Rorres, C., Chen, Y. and Gansner, E.R., Jun. 1998, Using automatic clustering to produce high-level system organizations of source code. In Proceedings. 6th International Workshop on Program Comprehension. IWPC'98 (Cat. No. 98TB100242) (pp. 45-52). IEEE. (Year: 1998).*

Prasandy, T., Murad, D.F. and Darwis, T., Aug. 2020, Migrating application from monolith to microservices. In 2020 International Conference on Information Management and Technology (ICIMTech) (pp. 726-731). IEEE. (Year: 2020).*

(56) References Cited

OTHER PUBLICATIONS

IBM: List of IBM Patents or Patent Applications Treated as Related, Dec. 6, 2021, pp. 1-2.
Tamilselvam, Srikanth Govindaraj et al., Pending U.S. Appl. No. 17/538,355, filed Nov. 30, 2021, titled "Identifying Microservices for a Monolith Application Through Static Code Analysis".
Sridhara, Giriprasad, et al., Pending U.S. Appl. No. 17/489,280, filed Sep. 29, 2021, titled "Translating Clusters of a Monolith Application to Microservices".
Tamilselvam, Srikanth Govindaraj et al., Pending U.S. Appl. No. 17/467,690, filed Sep. 7, 2021, titled "Constraints-Based Refactoring of Monolith Applications Through Attributed Graph Embeddings".
Mell, Peter, et al., The NIST Definition of Cloud Computing, National Institute of Standards and Technology, U.S. Department of Commerce, NIST Special Publication 800-145, Sep. 2011.
Harms, Holger, Collin Rogowski, and Luigi Lo Iacono. "Guidelines for Adopting Frontend Architectures and Patterns in Microservices-based Systems." Proceedings of the 2017 11th Joint Meeting on Foundations of Software Engineering. 2017.
Amiri, Mohammad Javad. "Object-aware lidentification of Microservices." 2018 IEEE International Conference on Services Computing (SCC). IEEE, 2018.
Ren, Zhongshan, et al. "Migrating Web Applications from Monolithic Structure to Microservices Architecture." Proceedings of the Tenth Asia-Pacific Symposium on Internetware. 2018.
Jin, Wuxia, et al. "Functionality-oriented Microservice Extraction Based on Execution Trace Clustering." 2018 IEEE International Conference on Web Services (ICWS). IEEE, 2018.
Nunes, Luís, Nuno Santos, and António Rito Silva. "From a Monolith to a Microservices Architecture: An Approach Based on Transactional Contexts." European Conference on Software Architecture. Springer, Cham, 2019.
Baresi, Luciano, Martin Garriga, and Alan De Renzis. "Microservices Identification Through Interface Analysis." European Conference on Service-Oriented and Cloud Computing. Springer, Cham, 2017.
Fritzsch, Jonas, et al. "From monolith to microservices: a classification of refactoring approaches." International Workshop on Software Engineering Aspects of Continuous Development and New Paradigms of Software Production and Deployment. Springer, Cham, 2018.
Desai U, Bandyopadhyay S, Tamilselvam S. Graph neural network to dilute outliers for refactoring monolith application. InProceedings of 35th AAAI Conference on Artificial Intelligence (AAAI'21) Feb. 7, 2021.
Bandyopadhyay S, Lokesh N, Murty MN. Outlier aware network embedding for attributed networks. In Proceedings of the AAAI conference on artificial intelligence Jul. 17, 2019 (vol. 33, No. 01, pp. 12-19).
Mazlami, Genc, Jürgen Cito, and Philipp Leitner. "Extraction of microservices from monolithic software architectures." 2017 IEEE International Conference on Web Services (ICWS). IEEE, 2017.
De Alwis, Adambarage Anuruddha Chathuranga, et al. "Function-splitting heuristics for discovery of microservices in enterprise systems." International Conference on Service-Oriented Computing. Springer, Cham, 2018.
System and Method for Cognitive Microservices Recommendations, IP.com Prior Art Database, Nov. 30, 2020.
Diluting Outliers for Refactoring Monolith Application through Attributed Graph Embeddings, IP.com Prior Art Database, Sep. 7, 2020.
System and Method for Identifying Critical Business Cases from a Monolith Application being Modernized with Optimized Business Value, IP.com Prior Art Database, Aug. 16, 2020.
Creating composite UI based on microservices, Microsoft Corporation, https://docs.microsoft.com/en-us/dotnet/ architecture/ microservices/architect-microservice-container-applications/ microservice-based-composite-ui-shape-layout, last accessed Nov. 30, 2021, published Sep. 15, 2021.
Jackson Cam, Micro Frontends, https://martinfowler.com/articles/ micro-frontends.html, last accessed Nov. 30, 2021, published Jun. 19, 2019.
Geers, Michael, What are Micro Frontends?, https://micro-frontends.org/, last accessed Nov. 30, 2021.
Gill, Navdeep Singh, Understanding Integration of dot js Frameworks to Micro Frontend, available at https://www.xenonstack.com/ blog/js-integration-micro-frontend, last accessed Nov. 30, 2021, published Mar. 21, 2019.
Witkowski, Robert, UI in Microservices World—Micro Frontends pattern and Web Components, available at https://medium.com/ @witek1902/ui-in-microservices-world-micro-frontends-pattern-and-web-components-23607a569363, last accessed Nov. 30, 2021, published Dec. 13, 2018.
What is Micro Frontend and How it Provides Benefits to the Startups?, Techuz InfoWeb Private Limited, https://www.techuz.com/blog/what-is-micro-frontend-and-how-it-provide-benefits-to-the-startups/, last accessed Nov. 30, 2021, published Feb. 28, 2018.
Abdullah, Muhammad et al., "Unsupervised Learning Approach for Web Application Auto-Decomposition into Microservices", published in Journal of Systems and Software, Feb. 2019.
Chen, Xi, et al. "Meta-learning for multi-objective reinforcement learning." 2019 IEEE/RSJ International Conference on Intelligent Robots and Systems (IROS). IEEE, Oct. 7, 2019.
James, Steven, et al., "An analysis of monte carlo tree search." Thirty-First AAAI Conference on Artificial Intelligence, Feb. 2017.
Jaderberg, Max, et al. "Reinforcement learning with unsupervised auxiliary tasks." arXiv preprint arXiv: 1611.05397 Nov. 16, 2016.
Van Moffaert, Kristof, et al. "Multi-objective reinforcement learning using sets of pareto dominating policies." The Journal of Machine Learning Research 15.1, Jan. 1, 2014, pp. 3483-3512.
Liang, Eric, et al. "RLlib: Abstractions for distributed reinforcement learning." International Conference on Machine earning. PMLR, Jul. 3, 2018.
Yang, Runzhe, et al., "A generalized algorithm for multi-objective reinforcement learning and policy adaptation." arXiv preprint arXiv: 1908.08342, Aug. 21, 2019.
Monte Carlo tree search, https://en.wikipedia.org/w/index.php?title=Monte_Carlo_tree_search&oldid=1050627850 (last visited Dec. 6, 2021.
International Search Report and Written Opinion from International Application No. PCT/CN2022/124669, 9 pages, mailed Dec. 15, 2022.
Japan Patent Office, "Notice of Reasons for Refusal" Sep. 2, 2025, 06 Pages, JP Application No. 2022-119230.
Alexander Krause, "Microservice Decomposition via Static and Dynamic Analysis of the Monolith", May 19, 2020 IEEE (Year: 2020).

* cited by examiner

MULTI-OBJECTIVE DRIVEN REFACTORING OF A MONOLITH APPLICATION USING REINFORCEMENT LEARNING

BACKGROUND

The present application generally relates to information technology and, more particularly, to modernizing applications.

Organizations are increasingly attempting to refactor monolith application architectures into microservice architectures as part of their journey to the cloud. Generally, refactoring a microservice architecture involves partitioning the software components into finer modules such that development of the modules can happen independently. Microservice architectures provide natural benefits when deployed in the cloud since resources can be allocated dynamically to necessary components based on demand.

SUMMARY

In one embodiment of the present disclosure, techniques for multi-objective driven refactoring of a monolith application using reinforcement learning are provided. An exemplary computer-implemented method includes obtaining multiple code modules of a monolith application and a plurality of conflicting metrics for determining a set of microservices for the monolith application; performing a reinforcement learning-based clustering process that iteratively generates a plurality of clusters comprising the code modules based at least in part on feedback provided for the plurality of conflicting metrics at each iteration; generating candidate microservices for the monolith application, wherein each candidate microservice corresponds to a different one of the plurality of clusters; and outputting the generated candidate microservices to at least one of a system and a user.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

A monolith application generally refers to an application that is built as a single unit. For example, a monolith application may include a database, a client-side user interface, and a server-side application server, where all of the functions are managed and served in one place. Accordingly, monolith applications often have a large and complex code base. Developers making changes or updates to the application must all access the same code base.

In a microservice architecture, the application is broken down into a number of microservices, where each microservice carries out a process of the application. The microservices can communicate with each other via application programming interfaces (APIs). In contrast to monolith architectures, each microservice can be updated or deployed independently.

Application refactoring refers to a process of rewriting one or more components of an application, for example, in order to make the application cloud enabled, or to convert the application from a monolith application to an application that uses a microservice architecture.

Refactoring a monolith application is a subjective process as there are no unique solutions. Evaluating a suggested set of microservices is also subjective as it depends on the subject matter experts (SME) involved.

In the case of automated microservice candidate generation, it is often useful to check for certain 'desirable properties' to filter poor microservices candidate suggestions. Such metrics may include, for example, modularity, structural modularity, non-extreme distribution (NED), interface number (IFN), chattiness, cluster/microservice purity, entrypoint purity, and average size, for example. However, the metrics are considered only after the microservice candidates are generated. It is also challenging to apply such metrics in a deep learning setting since the metrics do not directly influence an optimization objective of a deep learning network (e.g., not all metrics are differentiable, using multiple metrics can lead to unstable learning, and users might want to specify their own metrics). Due to these challenges, an alternate learning framework is needed.

As described herein, exemplary embodiments of the present disclosure include techniques that leverage such metrics as part of an automated process for generating candidate microservices for a given monolith application. Such embodiments can include performing a clustering process that is driven by feedback from conflicting metrics. For example, some embodiments include converting a clustering task of code modules in a monolithic code repository having multiple non-differentiable and/or non-decomposable metrics into a tree search-based reinforcement learning (RL) problem. Additionally, a multi-objective based RL model can be provided for finding Pareto optimal solutions for the conflicting metrics and, optionally, for performing an auxiliary outlier detection task.

Figure 1:
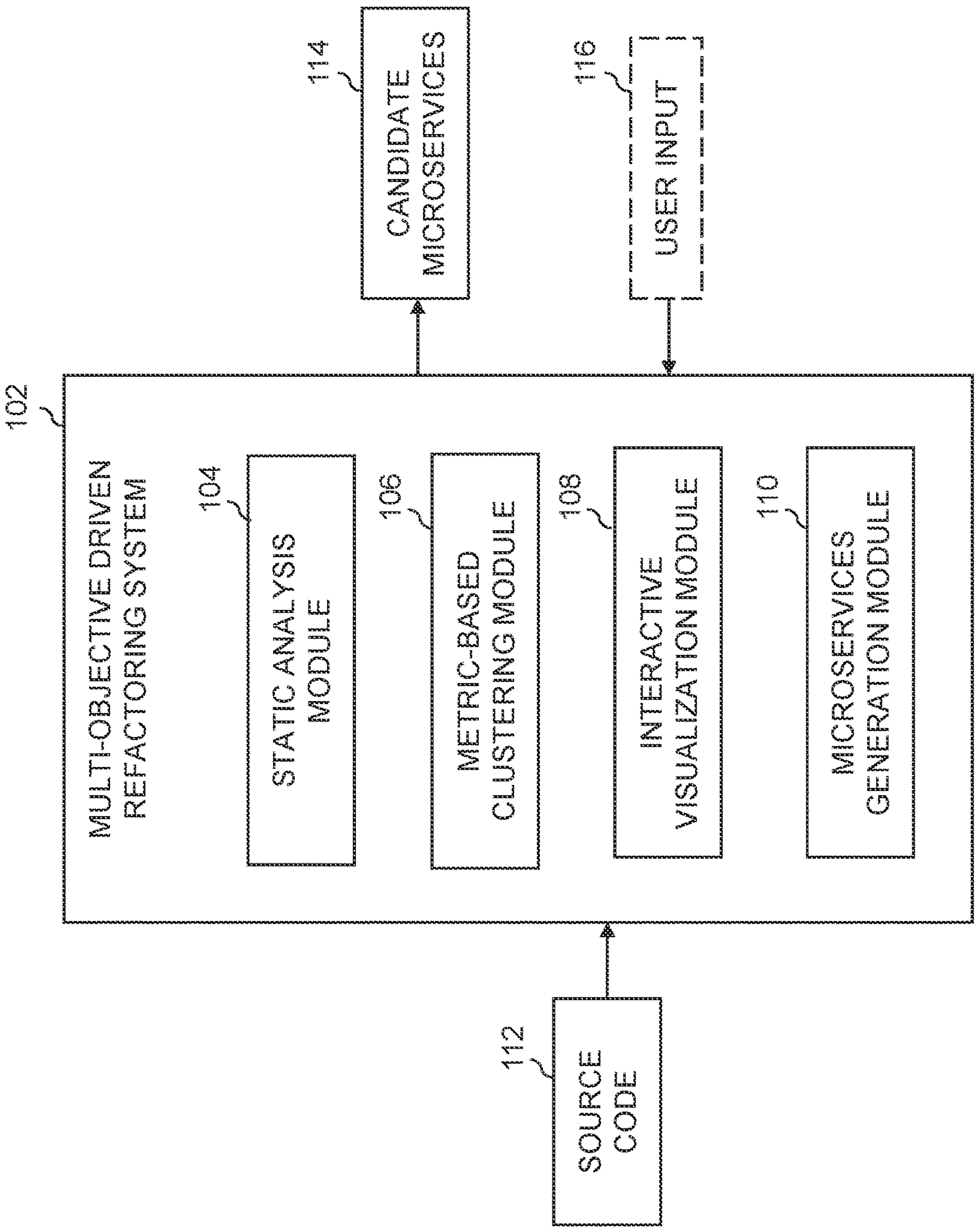
FIG. 1 is a diagram illustrating a system architecture in accordance with exemplary embodiments.

FIG. 1 shows a diagram illustrating a system architecture, according to an exemplary embodiment of the present disclosure. The FIG. 1 example includes a multi-objective driven refactoring system 102 comprising a static analysis module 104, a metric-based clustering module 106, an interactive visualization module 108, and a microservices generation module 110. Generally, the multi-objective driven refactoring system 102 obtains source code 112 of a monolith application and output a set of candidate microservices 114 for the monolith application.

The static analysis module 104 performs a static analysis on the source code 112 to determine multiple features of the monolith application. For example, the static analysis may be used to identify certain code modules (e.g., functions or classes) and, possibly, information of interactions between such code modules.

The metric-based clustering module 106 uses RL techniques and a set of conflicting metrics to assign the code modules to different clusters, where the clusters of code modules can be presented to the user in the form of candidate microservices 114, for example. Optionally, the metric-based clustering module 106 can incorporate user input 116 when determining the finalized set of clusters. For example, the interactive visualization module 108 can present visualizations of different options for clustering the code modules (corresponding to Pareto optimized solutions, for example), as explained in more detail elsewhere herein. In some embodiments, the microservices generation module 110 can automatically generate deployable microservices for at least a portion of the candidate microservices 114.

As noted above, the metric-based clustering module 106 can utilize RL techniques to cluster the code modules. RL generally refers to a machine learning training method that is based on rewarding desired behaviors and/or punishing undesired ones. For example, a software agent can perceive and interpret an environment, take actions, and learn through trial and error. RL is based on a reward policy, which defines rules of a game to be played by the software agent. RL problems rely on Markov Decision Processes (MDPs) to function. A MDP is a mathematical framework for sequential decision-making problems, where an RL agent can arrive at an optimal policy for obtaining maximum rewards over time. The MDP defines the environment, action, and reward for the RL task.

RL techniques are well-suited for non-differentiable loss or metrics, but there are technological challenges when applying RL when refactoring monolithic applications due to the size of the state space. For example, a graph with n nodes can lead to approximately n! choices of clusters when the number of clusters, K, is not specified, and $$\binom{n-1}{k-1}$$

choices if the number of clusters K is specified. When multiple conflicting metrics need to be considered, this becomes even more challenging due to the optimizations that would be needed. This problem is referred to herein as the RL combinatorial problem.

At least some embodiments can identify the elements needed for a MDP. Once these elements are identified, the RL combinatorial problem can be solved using one or more approaches (e.g., a Monte Carlo tree search (MCTS) algorithm) as explained in more detail elsewhere herein.

According to some embodiments, a state space of a MDP for clustering microservices of a monolith application can include a set of all possible cluster sets and a set of nodes (corresponding to the code modules, including software classes of the monolith application, for example). The action space can include placing a node in one of the clusters. For a single objective case, a single-stage reward function of the MDP can be a delayed reward at the end of episode. The end of an episode refers to a situation where all nodes have been assigned to one of the clusters. In some examples, the reward corresponds to a metric-based score for the cluster that is formed. In the multi-objective case, a single-stage reward function can be a delayed scalarized reward or a reward vector depending on the approach being implemented, as described in more detail elsewhere herein. For a reward vector, one dimension of the reward vector may correspond to one of the metrics.

One or more embodiments described herein apply a Pareto strategy in order to improve on multipole conflicting metrics. More specifically, a Pareto optimal solution typically is used when a solution does not exist that can optimize all metrics simultaneously. For a Pareto optimal solution, none of the objectives can be improved without degrading at least one of the other objectives. In this way, Pareto optimal solutions are considered non-dominating (or non-superior) over each other.

Figure 2:
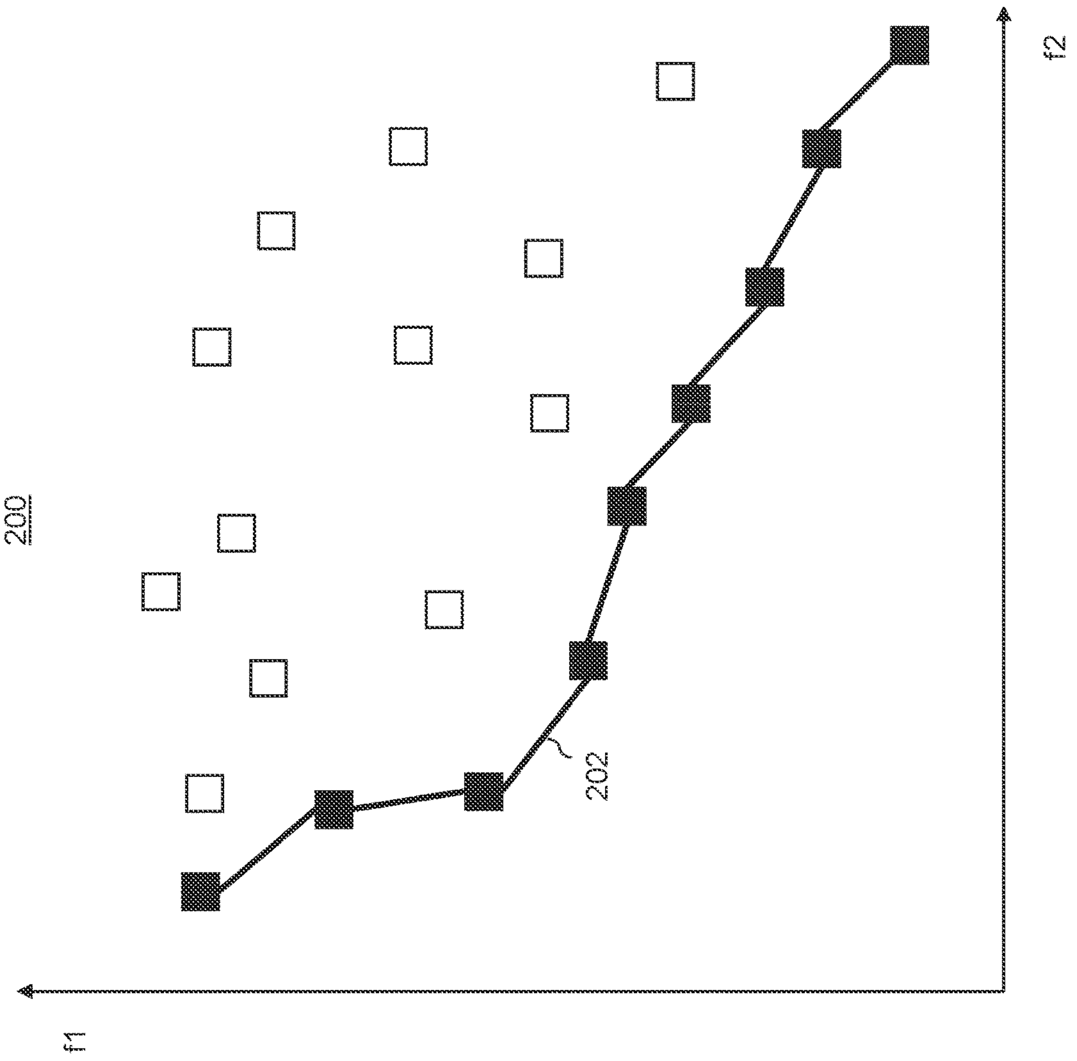
FIG. 2 is a visual representation of a Pareto front in accordance with exemplary embodiments.

Referring also to FIG. 2, this figure shows an example of a visual representation 200 of a Pareto front 202, in accordance with exemplary embodiments. A pareto front (also referred to as a frontier or boundary) includes a set of Pareto optimal solutions. In this example, it is assumed that the set of solid squares along the Pareto front 202 each represents a Pareto optimal solution corresponding to multiple conflicting metrics that are used to cluster code modules of a monolith application. The empty squares represent non-Pareto optimal solutions. Thus, a Pareto strategy can be utilized to improve on multiple conflicting metrics (e.g., modularity, structural modularity, NED, and IFN) when clustering the code modules. In some embodiments, a user can optionally interact with the visual representation 200 to adjust how the code modules are clustered, as described in more detail elsewhere herein.

A Pareto strategy may include, for example, finding a Pareto front with a vectorized value function or Q-function (based on which implementation is being used). The operation solution point can be selected by a user from the Pareto front, for example.

At least one embodiment includes applying a scalarization RL approach for the multi-objective case. The scalarization approach corresponds to a single policy algorithm that converts the multi-objective problem to a single objective problem by some scalarization function (e.g., based on weights). For example, objectives are ordered or ranked, and the appropriate weights can be applied based on the order or ranking to obtain the single objective problem, and one or more single objective RL algorithms are applied to the single objective problem.

Figure 3:
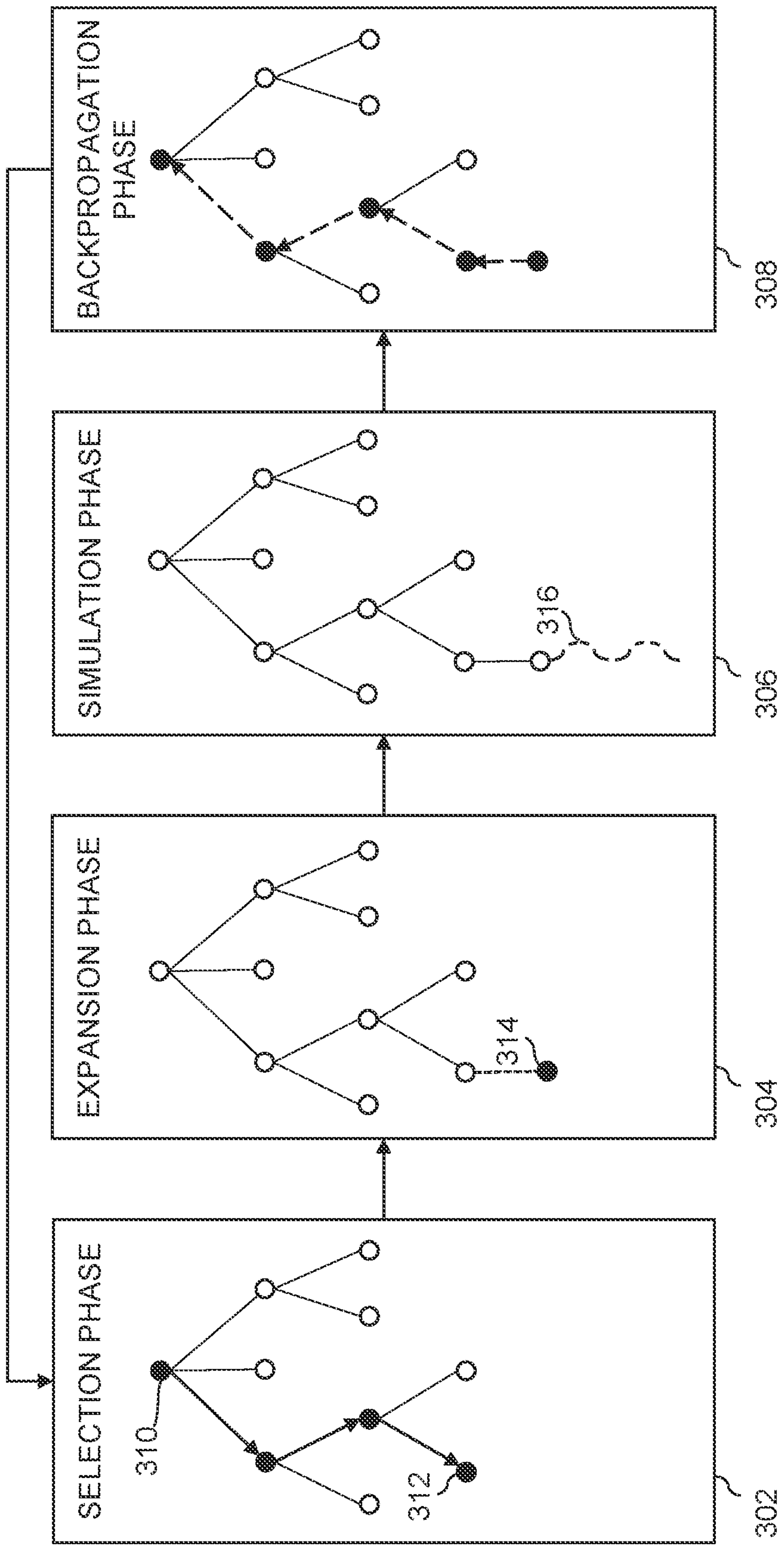
FIG. 3 is a high-level overview of a Monte Carlo tree search process in accordance with exemplary embodiments.

In some embodiments, the RL clustering techniques can include applying a Monte Carlo Tree Search (MCTS) to solve the MDP problem. FIG. 3 shows a high-level overview of a MCTS process in accordance with exemplary embodiments. The MCTS process includes a selection phase 302, an expansion phase 304, a simulation phase 306, and a back-propagation phase 308. FIG. 3 shows the state of a Markov decision tree with respect to each of the phases 302, 304,

306, and 308. At each phase, the dark nodes correspond to nodes that are involved in the current phase.

The selection phase 302 starts at a root node 310 corresponding to the current state of the MDP. For example, the root node 310 can correspond to a state where there are a number of empty candidate clusters and all the code modules of the monolith application need to be assigned to one of the clusters. The selection phase 302 selects a child node 312 corresponding to a particular code module being selected and assigned to one of the clusters. This selection is assumed to be performed by a software agent (e.g., a neural network), and thus corresponds to a MDP action. The selection can be made according to an upper confidence boundary (UCB) algorithm based on importance scores associated with the node, for example. For example, a UCB algorithm may select nodes by balancing exploration and exploitation by calculating the upper confidence bound. The upper confidence bound can be treated as an importance score.

In the expansion phase 304, when a node of the tree is obtained, where there are clusters that are not yet fully explored and/or formed, then a random cluster is selected, and the tree is expanded by placing the nodes (corresponding to modules) in one of the clusters. In FIG. 3, the expansion is represented by node 314. It is noted that the selection and expansion correspond to an MDP action.

The simulation phase 306 includes performing a random simulation until the clustering task is over. More specifically, the tree is expanded until a leaf node is reached, where a leaf node corresponds to a state where all the nodes (e.g., code modules) are assigned to one of the clusters. In FIG. 3, the simulation phase 306 is represented by dashed line 316.

The backpropagation phase 308 includes calculating the score (based on the metrics) for the leaf node, and back propagating a delayed reward (corresponding to the final metrics) score for the visited clusters, as represented by the dashed arrows in FIG. 3.

The reward in the scalarization approach for the multi-objective case can be obtained by performing the dot product of metrics vectors with a vector corresponding to the weights (or priorities), and the result is used in the back-propagation phase 308, where each dimension of a metrics vector corresponds to a different metric. For the Pareto strategy, the reward vector can be used directly without needing to convert it into a scaler value, and the backpropagation phase 308 can include using a conjugate gradient approach, for example.

In one or more embodiments, a neural network that is trained to perform the MCTS is also trained to perform an auxiliary task node classification task for detecting outliers. For example, during the node selection phase the chosen node is labeled by the neural network as being an outlier or not. The labels are then used to determine whether the node should be clustered or not. More specifically, a selected node is used for clustering only if it is not labeled as an outlier. This outlier detection task indirectly filters the possible states that MCTS needs to explore by providing feedback on the impact of certain nodes for the metrics. Implementing the auxiliary task along with the main objective in the neural network can improve RL training and can also provide improvements to the clustering.

Some embodiments provide an interactive interface that allows a user (e.g., an SME) to explore various recommendations and arrive at an acceptable result based on the Pareto strategy. Also, the Pareto strategy can be easily presented to the user using familiar metrics. The Pareto front can then be adjusted, via the interactive interface, which can improve the overall user experience. In such embodiments, the user can discard certain cluster suggestions or assign weights to one or more metrics based on a few series of cluster recommendations. The Pareto front also allows a user to focus on metrics and their effect on recommendations without needing to manually balance individual metrics. In some embodiments, the interface can configure the Pareto front to visualize API endpoints and dependencies, in addition to the metrics, thereby providing the user with further tools to determine the proper clusters.

By way of example, the following table provides explanations for at least some of the metrics that can be considered in one or more embodiments:

| Quality Aspect | Metric | Applicability | Description |
|---|---|---|---|
| Coupling | Data independence | Overall | Measures percentage of database tables that are accessed by only one partition |
| | Transaction independence | Overall | Measures percentage of DB transactions call sequence that span across partitions |
| | Data Locality | Individual Partition | Measures ratio of data objects scoped within a partition with objects escaping the partition |
| | Inter-partition call volume (runtime) | Pairwise | Inter-partition call volume |
| | Modularity | Overall | Measures the strength of division of a network into modules (partitions, community). Effectively, captures class call path and dependencies (temporal and higher-order, static/runtime) |
| | Self-encapsulation | Individual Partition | Number of Interface classes exposed |
| Domain Redundancy | Functional independence | Overall | Measures the number of partitions that contribute to a sub domain functionality |
| | Name based Semantic Relatedness | Pairwise | Measures semantic relatedness of classes across the recommended partitions |
| Effort | Cyclomatic complexity | Individual Partition | Measures code complexity of the individual implemented services. |
| Cohesion | Cohesion of Classes | Individual Partition | Measures the inter class usage within a partition |

Some embodiments can further include at least partially converting the candidate microservices of the monolith application into deployable microservices (e.g., a monolith web API can be automatically converted to a REST (representational state transfer) API).

Figure 4:
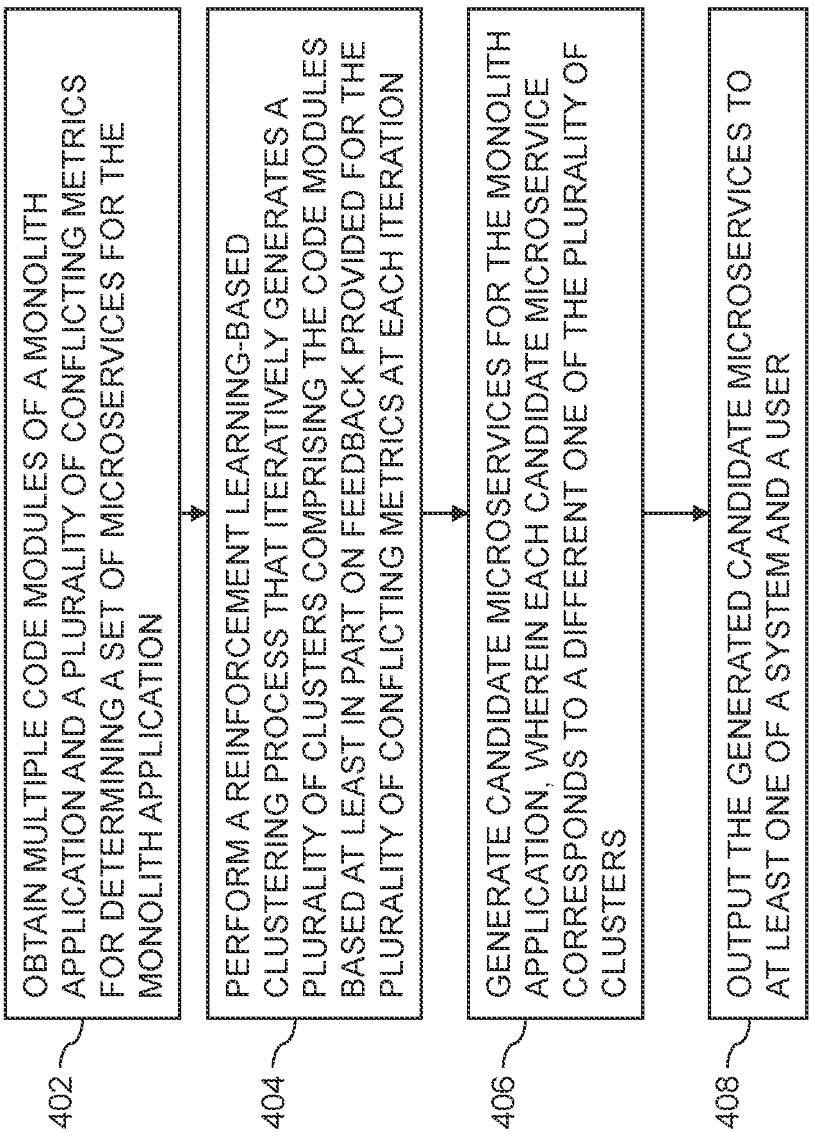
FIG. 4 is a flow diagram illustrating techniques for multi-objective driven refactoring using reinforcement learning in accordance with exemplary embodiments.

FIG. 4 is a flow diagram illustrating techniques for multi-objective driven refactoring using reinforcement learning in accordance with exemplary embodiments. Step 402 includes obtaining multiple code modules of a monolith application and a plurality of conflicting metrics for determining a set of microservices for the monolith application. Step 404 includes performing a reinforcement learning-based clustering process that iteratively generates a plurality of clusters comprising the code modules based at least in part on feedback provided for the plurality of conflicting metrics at each iteration. Step 406 includes generating candidate microservices for the monolith application, wherein each candidate microservice corresponds to a different one of the plurality of clusters. Step 408 includes outputting the generated candidate microservices to at least one of a system and a user.

The process may include a step of training a neural network to perform a Monte Carlo tree search over a Markov decision tree, wherein the Markov Decision tree comprises a root node representing a current state of the plurality of clusters and at least one leaf node representing a state where each code module is assigned to a given one of the plurality of clusters. The training may include training the neural network to perform an auxiliary task to classify whether or not each node in the Markov decision tree is an outlier. The neural network may be trained to perform an auxiliary task to classify whether or not each node in the Markov decision tree is an outlier, and the neural network may skip nodes of the Markov decision tree that are classified as outliers. The neural network may be trained to select a node of the Markov decision tree using an upper confidence boundary algorithm based on a score of the node, and the scores may be computed based at least in part on the conflicting metrics. The plurality of clusters may correspond to a Pareto optimized solution based on the conflicting metrics. The process may include the following steps: outputting, to an interactive interface, a visual representation of a Pareto front comprising a plurality of Pareto optimized solutions corresponding to the conflicting metrics; and updating the plurality of clusters based at least in part on a user selection with a point on the Pareto front. The visual representation may include information corresponding to at least one of: one or more endpoints of the monolith application and one or more dependencies of the monolith application. The conflicting metrics comprise at least two of: a modularity metric; a structural modularity metric; a non-extreme distribution metric; and an interface number metric.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
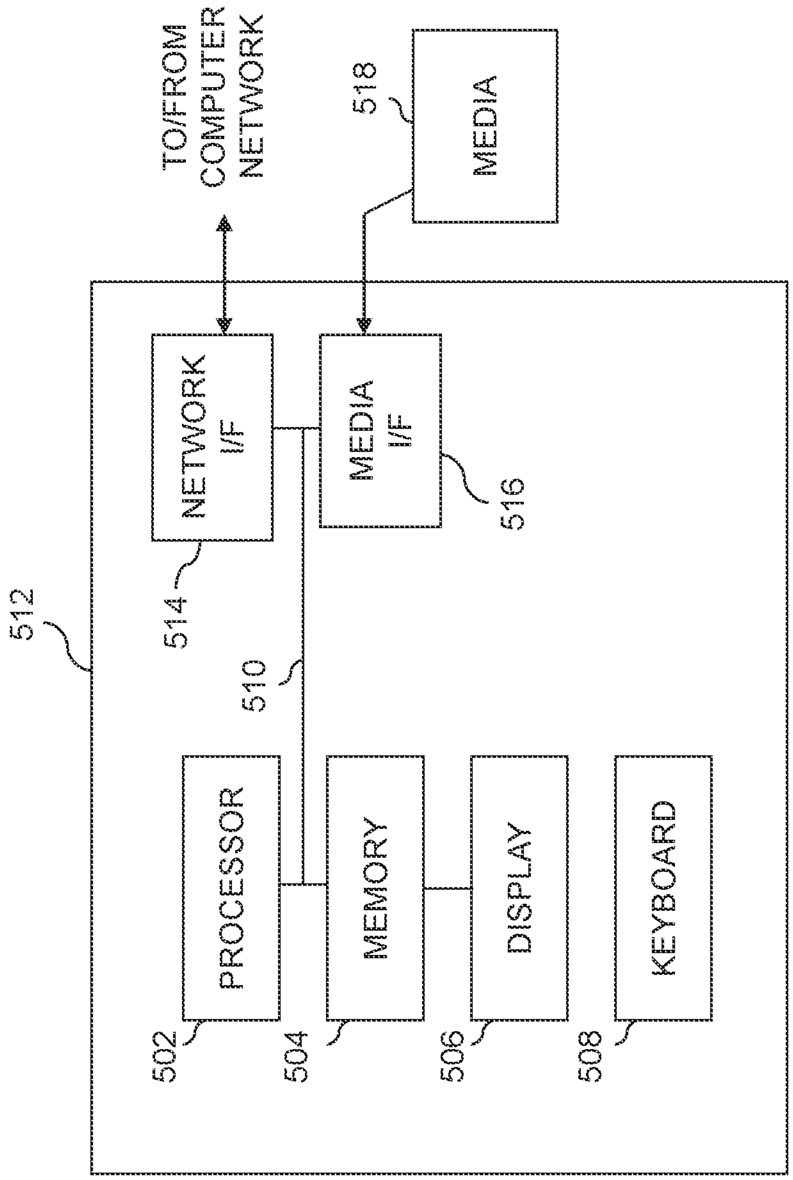
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
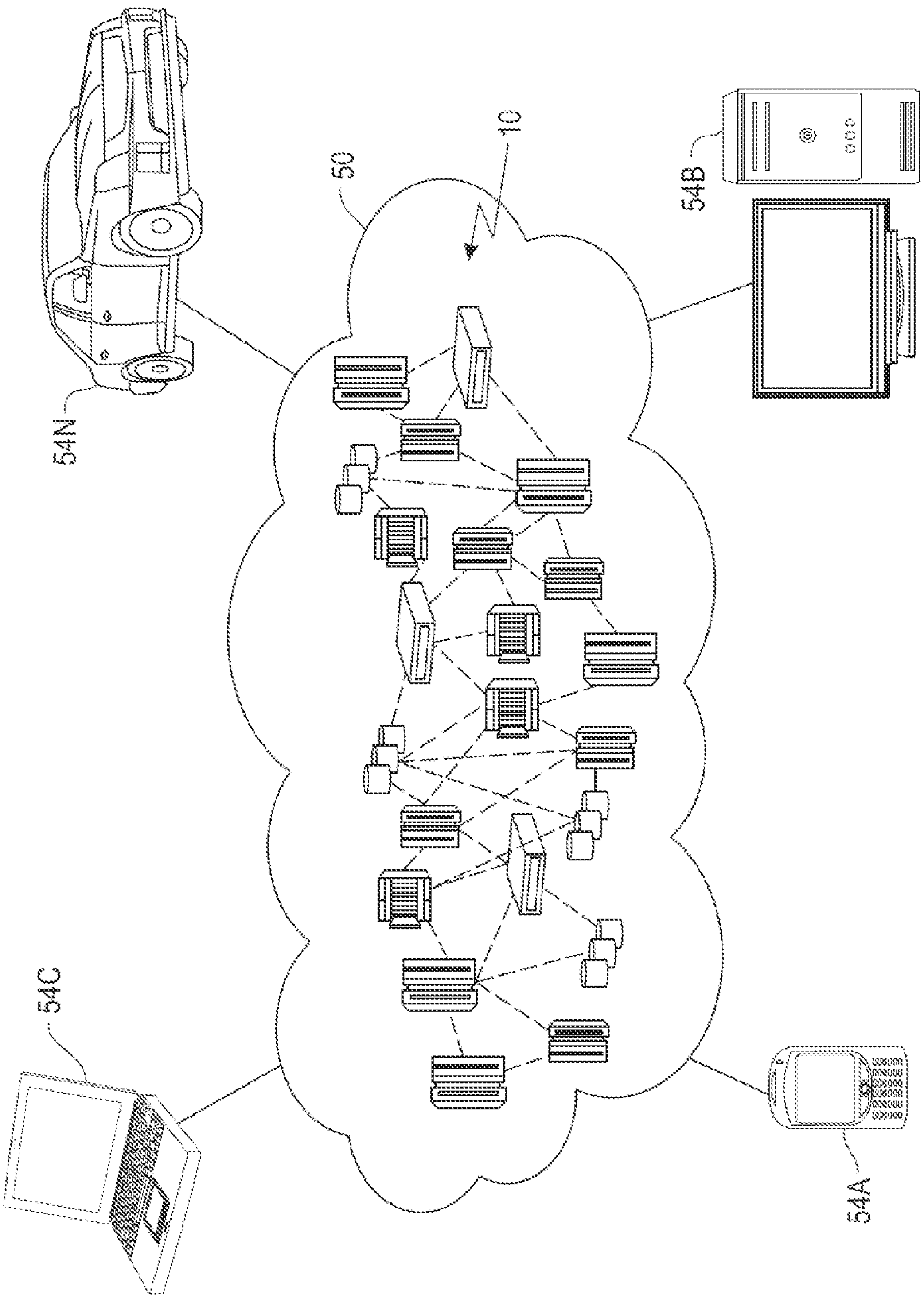
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
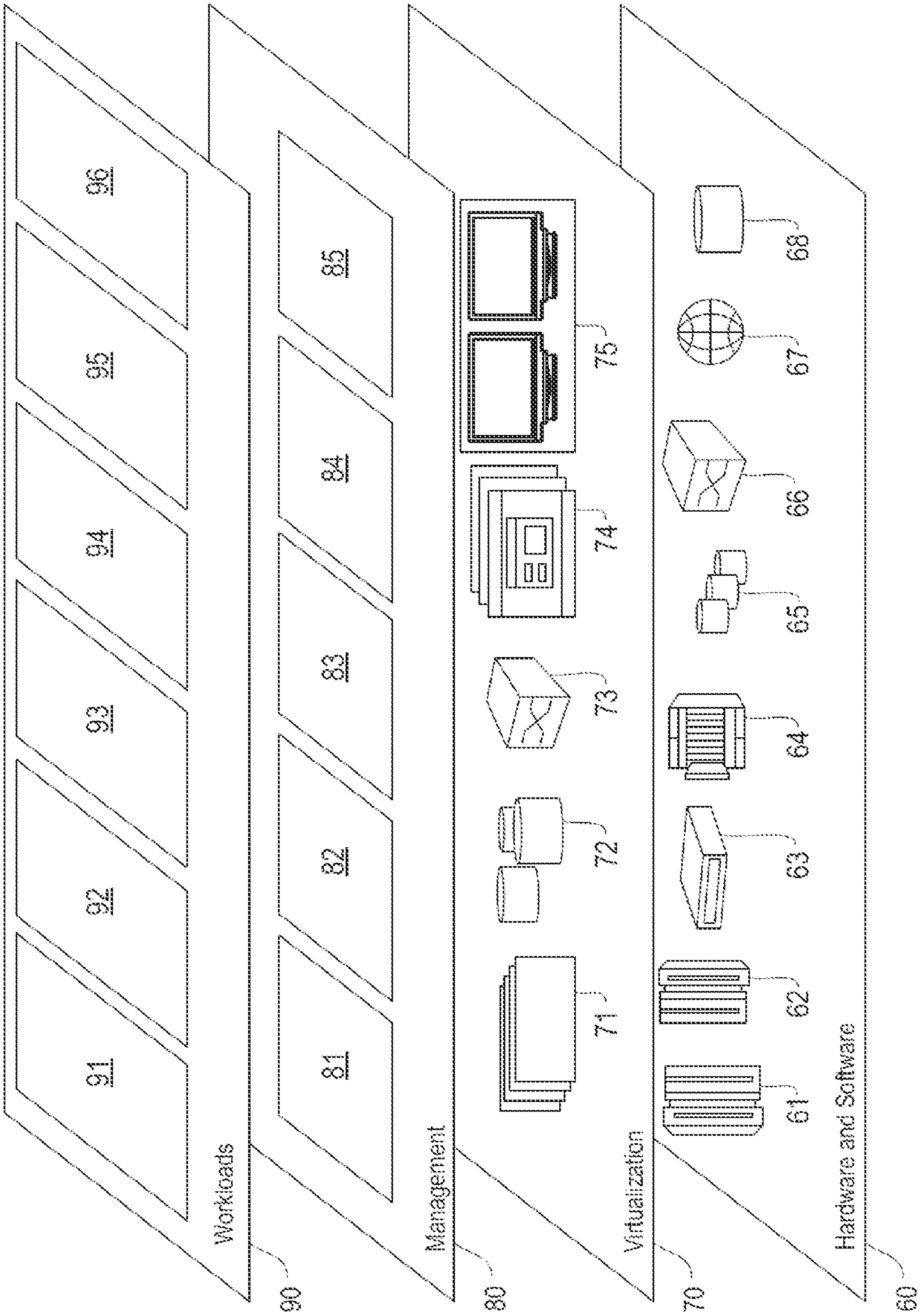
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying microservices 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improved performance and flexibility for automatically converting a monolith application into a microservice architecture by jointly identifying and evaluating candidate microservices based on a set of conflicting metrics.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining multiple code modules of a monolith application and a plurality of conflicting metrics for determining a set of microservices for the monolith application;

performing a reinforcement learning-based clustering process that iteratively generates a plurality of clusters comprising the code modules based at least in part on feedback provided for the plurality of conflicting metrics at each iteration, wherein the feedback comprises a reward vector having a plurality of dimensions, the plurality of dimensions corresponding to at least a portion of the plurality of conflicting metrics, wherein the reinforcement learning-based clustering process comprises training a neural network to perform a Monte Carlo tree search over a Markov decision tree, wherein the Markov decision tree comprises a root node representing a current state of the plurality of clusters and at least one leaf node representing a state where each of at least a portion of the code modules is assigned to a given one of the plurality of clusters;

generating candidate microservices for the monolith application, wherein each candidate microservice corresponds to a different one of the plurality of clusters;

outputting the generated candidate microservices to at least one of a system and a user; and automatically generating one or more deployable microservices for at least a portion of the candidate microservices, wherein at least one of the candidate microservices corresponds to a monolith web application programming interface, and wherein automatically generating the one or more deployable microservices comprises converting the monolith web application programming interface to a representational state transfer application programming interface;

wherein the method is carried out by at least one computing device.

2. The computer-implemented method of claim 1, wherein the training comprises:

training the neural network to perform an auxiliary task to classify whether or not each node in the Markov decision tree is an outlier.

3. The computer-implemented method of claim 2, wherein the neural network is trained to perform an auxiliary task to classify whether or not each node in the Markov decision tree is an outlier, and wherein the neural network skips nodes of the Markov decision tree that are classified as outliers.

4. The computer-implemented method of claim 1, wherein the neural network is trained to select a node of the Markov decision tree using an upper confidence boundary algorithm based on a score of the node, wherein the score is computed based at least in part on the conflicting metrics.

5. The computer-implemented method of claim 1, wherein the plurality of clusters corresponds to a Pareto optimized solution based on the conflicting metrics.

6. The computer-implemented method of claim 1, comprising:

outputting, to an interactive interface, a visual representation of a Pareto front comprising a plurality of Pareto optimized solutions corresponding to the conflicting metrics; and updating the plurality of clusters based at least in part on a user selection with a point on the Pareto front.

7. The computer-implemented method of claim 6, wherein the visual representation comprises information corresponding to at least one of: one or more endpoints of the monolith application and one or more dependencies of the monolith application.

8. The computer-implemented method of claim 1, wherein the conflicting metrics comprise at least two of:

a modularity metric;

a structural modularity metric;

a non-extreme distribution metric; and an interface number metric.

9. The computer-implemented method of claim 1, wherein the Monte Carlo tree search comprises a backpropagation phase, and wherein the backpropagation phase comprises a conjugate gradient approach that evaluates the reward vector without converting the reward vector into a scalar value.

10. A computer program product comprising a computer readable storage medium having program instructions embodied therewith, the program instructions executable by a computing device to cause the computing device to:

obtain multiple code modules of a monolith application and a plurality of conflicting metrics for determining a set of microservices for the monolith application;

perform a reinforcement learning-based clustering process that iteratively generates a plurality of clusters comprising the code modules based at least in part on feedback provided for the plurality of conflicting metrics at each iteration, wherein the feedback comprises a reward vector having a plurality of dimensions, the plurality of dimensions corresponding to at least a portion of the plurality of conflicting metrics, wherein the reinforcement learning-based clustering process comprises training a neural network to perform a Monte Carlo tree search over a Markov decision tree, wherein the Markov decision tree comprises a root node representing a current state of the plurality of clusters and at least one leaf node representing a state where each of at least a portion of the code modules is assigned to a given one of the plurality of clusters;

generate candidate microservices for the monolith application, wherein each candidate microservice corresponds to a different one of the plurality of clusters;

output the generated candidate microservices to at least one of a system and a user; and automatically generate one or more deployable microservices for at least a portion of the candidate microservices, wherein at least one of the candidate microservices corresponds to a monolith web application programming interface, and wherein automatically generating the one or more deployable microservices comprises converting the monolith web application programming interface to a representational state transfer application programming interface.

11. The computer program product of claim 10, wherein the training comprises:

training the neural network to perform an auxiliary task to classify whether or not each node in the Markov decision tree is an outlier.

12. The computer program product of claim 11, wherein the neural network is trained to perform an auxiliary task to classify whether or not each node in the Markov decision tree is an outlier, and wherein the neural network skips nodes of the Markov decision tree that are classified as outliers.

13. The computer program product of claim 10, wherein the neural network is trained to select a node of the Markov decision tree using an upper confidence boundary algorithm based on a score of the node, wherein the score is computed based at least in part on the conflicting metrics.

14. The computer program product of claim 10, wherein the plurality of clusters corresponds to a Pareto optimized solution based on the conflicting metrics.

15. The computer program product of claim 10, wherein the program instructions executable by a computing device further cause the computing device to:

output, to an interactive interface, a visual representation of a Pareto front comprising a plurality of Pareto optimized solutions corresponding to the conflicting metrics; and update the plurality of clusters based at least in part on a user selection with a point on the Pareto front.

16. The computer program product of claim 15, wherein the visual representation comprises information corresponding to at least one of: one or more endpoints of the monolith application and one or more dependencies of the monolith application.

17. The computer program product of claim 10, wherein the conflicting metrics comprise at least two of:

a modularity metric;

a structural modularity metric;

a non-extreme distribution metric; and an interface number metric.

18. The computer program product of claim 10, wherein the Monte Carlo tree search comprises a backpropagation phase, and wherein the backpropagation phase comprises a conjugate gradient approach that evaluates the reward vector without converting the reward vector into a scalar value.

19. A system comprising:

a memory configured to store program instructions;

a processor operatively coupled to the memory to execute the program instructions to:

obtain multiple code modules of a monolith application and a plurality of conflicting metrics for determining a set of microservices for the monolith application;

perform a reinforcement learning-based clustering process that iteratively generates a plurality of clusters comprising the code modules based at least in part on feedback provided for the plurality of conflicting metrics at each iteration, wherein the feedback comprises a reward vector having a plurality of dimensions, the plurality of dimensions corresponding to at least a portion of the plurality of conflicting metrics, wherein the reinforcement learning-based clustering process comprises training a neural network to perform a Monte Carlo tree search over a Markov decision tree, wherein the Markov decision tree comprises a root node representing a current state of the plurality of clusters and at least one leaf node representing a state where each of at least a portion of the code modules is assigned to a given one of the plurality of clusters;

generate candidate microservices for the monolith application, wherein each candidate microservice corresponds to a different one of the plurality of clusters;

output the generated candidate microservices to at least one of a system and a user; and automatically generate one or more deployable microservices for at least a portion of the candidate microservices, wherein at least one of the candidate microservices corresponds to a monolith web application programming interface, and wherein automatically generating the one or more deployable microservices comprises converting the monolith web application programming interface to a representational state transfer application programming interface.

20. The system of claim 19, wherein the Monte Carlo tree search comprises a backpropagation phase, and wherein the backpropagation phase comprises a conjugate gradient approach that evaluates the reward vector without converting the reward vector into a scalar value.

* * * * *